United States Patent Office 3,576,885
Patented Apr. 27, 1971

3,576,885
TERMINALLY UNSATURATED FLUORO-OLEFINS AND PROCESS FOR THE PREPARATION THEREOF
Louis G. Anello, Basking Ridge, and Richard F. Sweeney, Randolph Township, Morris County, N.J., assignors to Allied Chemical Corporation, New York, N.Y.
No Drawing. Filed Nov. 9, 1967, Ser. No. 681,886
Int. Cl. C07c *43/0, 43/14*
U.S. Cl. 260—614     9 Claims

ABSTRACT OF THE DISCLOSURE

Terminally unsaturated fluoro-olefinic compounds of the formula

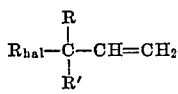

wherein R and R' represent hydrogen or alkyl, and wherein $R_{hal}$ is perfluoroalkyl or a radical of the formula

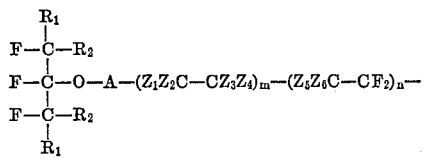

wherein $R_1$ and $R_2$ are Cl, F, alkyl, haloalkyl, or alkylene and haloalkylene groups forming a cycloaliphatic structure, wherein A represents alkylene or haloalkylene groups, wherein

are bifunctional groups derived from certain telomerizable ethylenically unsaturated compounds, and wherein m and n are integers of from 0 to 75, are prepared by reacting polyfluoroalkyl iodides $H_{hal}I$, wherein $R_{hal}$ has the aforestated meaning, with 1-hydroxy-2-alkenes having the formula

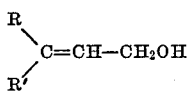

wherein R and R' have the aforestated meanings. These terminally unsaturated fluoro-olefinic compounds are useful as intermediates in the preparation of useful polyacrylate oil and stain repellent agents. Certain of these terminally unsaturated fluoro-olefinic compounds are novel compounds.

CROSS-REFERENCES TO RELATED APPLICATIONS (1) Co-pending application of Anello et al., entitled "Telomers and Process for the Preparation Thereof," Ser. No. 633,359, filed Apr. 25, 1967 now U.S. Patent 3,514,487.

(2) Co-pending application of Litt et al., entitled "Fluorinated Ethers," Ser. No. 492,276, filed Oct. 1, 1965 now U.S. Patent 3,453,333.

(3) Co-pending application of Litt et al., entitled "Fluorinated Ethers," Ser. No. 513,574, filed Dec. 13, 1965 now U.S. Patent 3,470,256.

BACKGROUND OF THE INVENTION

This invention relates to a new process for preparing terminally unsaturated polyfluoro-olefinic compounds, and to certain new terminally unsaturated polyfluoro-olefinic compounds.

Highly fluorinated organic compounds differ from their carbon-hydrogen analogues in their increased stability and resistance to attack by many reagents, hence may be modified only with great difficulties. Terminally unsaturated polyfluoro-olefinic compounds, on the other hand, due to the reactivity of the terminal olefinic unsaturation, are capable of entering into a number of useful reactions leading to other polyfluorinated compounds of art-recognized utility.

It is known to prepare terminally unsaturated polyfluoroolefinic compounds by various methods, as for example by dehydrohalogenation of polyhaloalkanes by means of base catalyzed elimination, high temperature catalysis, or pyrolysis, or by dehydration of fluorine containing alcohols. The preparation of terminally unsaturated polyfluoro-olefinic compounds by these methods, however, in many cases presents difficulties. So, for instance, in the base catalyzed dehydrohalogenation of highly fluorinated alkanes in alcoholic media the elimination reaction may be complicated by the formation of ethers, and the dehydration of some fluorine containing alcohols is very difficult or even impossible due to the strengthening of the C—O bond resulting from the inductive effect of the fluorine atoms. For these and other reasons the provision of new methods for the preparation of terminally unsaturated fluoro-olefinic compounds is highly desirable.

Accordingly, it is an object of the present invention to provide a novel method for the preparation of terminally unsaturated polyfluoro-olefinic compounds.

It is a further object of the present invention to provide novel terminally unsaturated polyfluoro-olefinic compounds.

These and other objects of the present invention will become apparent from the following description and claims.

SUMMARY OF THE INVENTION

The terminally unsaturated polyfluoro-olefinic compounds which may be prepared by the process of the present invention have the structure

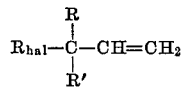

wherein R and R' are independently selected from the group consisting of hydrogen and alkyl radicals, linear or branched chain, having from 1 to 10 carbons, and wherein $R_{hal}$ is a radical selected from the group consisting of perfluoroalkyl, linear or branched chain, having from 1 to 20 carbons, and a radical having the formula

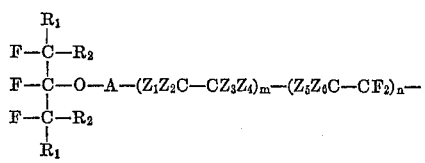

wherein:

(a) $R_1$ and $R_2$ are F, Cl or alkyl or haloalkyl groups or, when taken together, are alkylene or haloalkylene groups forming a cycloaliphatic structure, which $R_1$ and $R_2$ groups may each have from 1 to 9 carbon atoms and which halogen atoms, if any, have an atomic weight not exceeding about 79.91, with the proviso that no more than two of the four $R_1$ and $R_2$ groups are alkyl groups, (b) A is a member selected from the group consisting of radicals of the formulae:

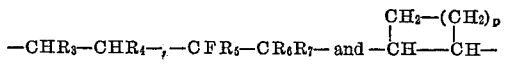

wherein $R_3$ and $R_4$ are independently selected from the group consisting of Cl, H and alkyl; $R_5$ and $R_6$ are independently selected from the group consisting of F and H; $R_7$ is selected from the group consisting of F, H, Cl, Br and perfluoroalkyl; $p$ is an integer of from 1 to 9; with the proviso that when both $R_6$ and $R_7$ are F, $R_5$ is always F, and with the further proviso that when in above Formula I both $m$ and $n$ are O, A is always —$CF_2$—$CF_2$—, (c) —$(Z_1Z_2C$—$CZ_3Z_4)$— is a bifunctional group derived from a telomerizable ethylenically unsaturated compound wherein (i) $Z_1$, $Z_2$, $Z_3$ and $Z_4$ may each be selected from the group consisting of H, F, Cl and Br provided that $Z_1$–$Z_4$ do not include more than two chlorine atoms and one bromine atom, (ii) when at least two members of the group $Z_1$, $Z_2$, $Z_3$, and $Z_4$ are H or F, the remaining two members may each be a perhalomethyl group having the formula —$C(X_a)_3$, wherein $X_a$ is a halogen atom having an atomic weight not exceeding about 79.91, (iii) when $Z_1$ and $Z_3$ are each H or F, each of $Z_2$ and $Z_4$ may additionally be selected from the group consisting of —$CF_2X_b$, —$Y_1$—$OY_2$, —$Y_1$—$Y_3$, and —$O$—$Y_4$, wherein $X_b$ is an alkyl radical having from 1–8 carbon atoms or a haloalkyl radical having from 1–8 carbon atoms, in which haloalkyl radical the halogen atoms have an atomic weight not exceeding about 79.91, and wherein $Y_1$ is a saturated divalent alkylene group or a saturated divalent halogen containing bridging group in which the halogen atoms have atomic weights not exceeding about 79.91; $Y_2$ is a member selected from the group consisting of H and alkyl; $Y_3$ is aryl; and $Y_4$ is alkyl, and (iv) when $Z_1$, $Z_2$ and $Z_3$ are each H or F, $X_b$ may additionally be an aryl, a haloaryl, an alkaryl or a haloalkaryl group having from 1 to 5 carbon atoms in the alkyl group, and (v) $Z_3$ and $Z_4$ or $Z_1$ and $Z_3$ may be joined together to form a cycloaliphatic ring system, (d) $m$ is an integer of from 0 to 75, (e) —$(Z_5Z_6C$—$CF_2)$— is a bifunctional group derived from a telomerizable ethylenically unsaturated compound, wherein (i) $Z_5$ and $Z_6$ may each be selected from the group consisting of H, F, Cl, Br and a perhalomethyl group having the formula —$C(X_a)_3$, wherein $X_a$ is a halogen atom having an atomic weight not exceeding about 79.91, provided that $Z_5$ and $Z_6$ do not include more than one bromine atom, (ii) when $Z_5$ is H or F, $Z_6$ may additionally be selected from the group consisting of —$CF_2X_b$, —$Y_1$—$OY_2$, —$Y_1$—$Y_3$, and —$O$—$Y_4$, wherein $X_b$ is an alkyl radical having from 1–8 carbon atoms, or a haloalkyl radical having from 1–8 carbon atoms, in which haloalkyl radical the halogen atoms have an atomic weight not exceeding about 79.91, or an aryl, a haloaryl, an alkaryl, or a haloalkaryl radical having from 1 to 5 carbon atoms in the alkyl group, and wherein $Y_1$ is a saturated divalent alkylene bridging group or a saturated divalent halogen containing bridging group in which the halogen atoms have atomic weights not exceeding about 79.91; $Y_2$ is a member selected from the group consisting of H and alkyl; $Y_3$ is aryl; and $Y_4$ is alkyl, and (f) $n$ is an integer of from 0 to 75.

When $X_b$ in the above formulas is an alkyl, haloalkyl, alkenyl or alkyl-substituted aryl radical, these may be straight-chain or branched-chain groups, preferably containing up to 12 carbon atoms. When $X_b$ is an aryl or otherwise substituted aryl radical, aryl groups such as phenyl or naphthyl and substituted derivatives, thereof, including ortho-, and meta- or para-substituted derivatives thereof are contemplated such as ortho-, meta- or parachlorophenyl; ortho-, and meta- or para-tolyl.

Those polyfluoro-olefinic compounds wherein $R_{hal}$ has the Formula I, above, are novel compounds.

In accordance with this invention we have discovered that polyfluoroalkyl iodides having the Formula $R_{hal}I$ wherein $R_{hal}$ has the aforestated meaning can be reacted with 1-hydroxy-2-alkenes having the formula

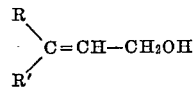

wherein R and R' are independently selected from the group consisting of hydrogen and alkyl radicals, linear or branched-chain, having from 1 to 10 carbons, to yield polyfluoro-2-alkenes according to the equation

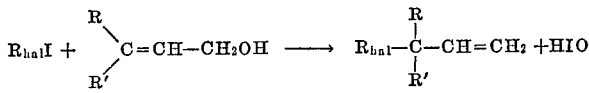

wherein $R_{hal}$, R and R' have the aforestated meanings. This reaction is entirely unexpected.

The mechanism of the novel reaction of this invention is not entirely clear. Mechanisms may be postulated involving the addition of the double bond of the polyfluoroalkyl iodide, followed by elimination of hypiodous acid according to the equations:

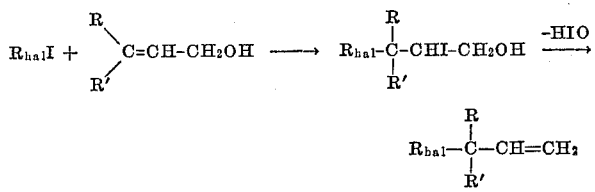

Terminally unsaturated polyfluoro-olefinic compounds are valuable intermediates for the preparation of adhesives, emulsifiers, and textile stain repellents. In such use they may be used as such, or may be first converted to the corresponding polyfluoroalkyl - 2 - propanol by treatment with sulfuric acid according to the equation:

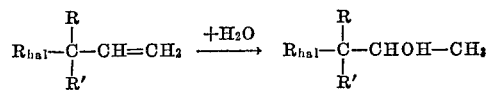

as shown in British Patent 983,921. These polyfluoroalkyl-2-propanols may, for example, be conventionally reacted with acrylic compounds to yield acrylate monomers which may be polymerized to yield polymers which may be applied to porous materials, such as textiles and the like, to impart hydrophobic and oleophobic properties thereto.

Polyfluoroalkyliodide starting materials of the type wherein $R_{hal}$ is perfluoroalkyl, linear or branched chain, having from 1 to 20 carbons, are in many cases commercially available. They may be prepared by known methods, as for example described by Haszeldine in the Journal of the Chemical Society, 1952, p. 4259; as described by Brice and Simons in the Journal of the American Chemical Society, vol. 73, p. 4016 (1951); as described by Krespan in the Journal of Organic Chemistry, vol. 23, p. 2016 (1958); or as described in U.S.P. 3,234,294 to Parsons.

Preparation of polyfluoroalkyl iodide starting materials of the type wherein $R_{hal}$ is

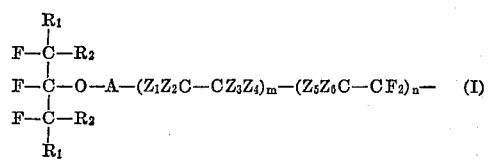

wherein $R_1$, $R_2$, and A have the aforestated meanings, and wherein $m$ and $n$ are both 0, is described in copending applications of Litt et al., Ser. Nos. 492,276 and 513,574, filed Oct. 1, 1965, and Dec. 13, 1965, respectively now U.S. Patents 3,453,333 3,470,276, respectively, the pertinent subject matter of which is hereby incorporated by reference. Preparation of polyfluoroalkyl iodide starting materials wherein $R_{hal}$ has the Formula I above wherein $R_1$, $R_2$, $A$, $—(Z_1Z_2C—CZ_3Z_4)—$, $—(Z_5Z_6C—CF_2)—$, $m$ and $n$ have the aforestated meanings, and wherein the sum of $m$ and $n$ is at least one, is described in copending application of Anello et al., Ser. No. 633,359, filed Apr. 25, 1967 now U.S. Patent 3,514,487, the pertinent subject matter of which is also incorporated by reference. The latter polyfluoroalkyl iodides hereinafter are referred to as telomer iodides. As described in more detail in the referred to Anello et al. patent, these telomer iodides are prepared by radical addition reactions of polyhaloisoalkoxyalkyl halide telogens of the formula

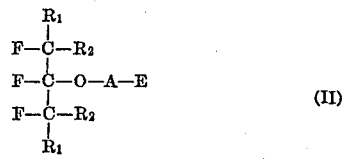
(II)

wherein $R_1$, $R_2$, and $A$ have the aforestated meanings, and wherein E is I or Br, with telomerizable unsaturated compounds. The telomerization reaction may be initiated by heat or by means of a free-radical initiating catalyst. The telogen starting materials may be prepared by reacting a corresponding halogenated ketone with an ionizable fluoride salt, e.g. CsF, to form a fluorinated organic salt and then reacting the organic salt with a halogen other than fluorine and an olefin as more fully described in the referred to Litt et al. patents.

Some of the 1-hydroxy-2-alkenes of the type

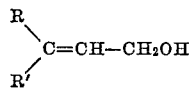

wherein R and R' are independently selected from the group consisting of hydrogen and alkyl radicals, linear or branched chain, having from 1 to 10 carbons, for example allyl alcohol and crotyl alcohol, are commercially available. Others may be prepared by known methods. One such method which utilizes as starting material acids having the formula

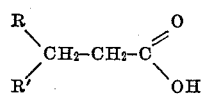

wherein R and R' have the aforestated meanings, involves the steps of (1) bromination of the α-carbon of the acid with elemental bromine, (2) dehydrobromination of the α-bromo acid to obtain the corresponding α-ethylenically unsaturated acid, (3) esterification of the α-ethylenically unsaturated acid, and (4) reduction of the ester e.g. with lithium aluminum hydride to obtain the β-unsaturated alcohol.

DESCRIPTION OF THE PREFERRED EMBODIMENTS

With reference to Formula I, $R_1$ and $R_2$ are preferably F or perfluoroalkyl groups. If perfluoroalkyl groups, $R_1$ and $R_2$ preferably contain 1–2 carbon atoms. When the $R_1$ and $R_2$ groups contain halogen substitution, other than fluorine, or hydrogen substitution, it is preferred that enough fluorine substitution be provided so that the atomic ratio of fluorine to the other halogen atoms, to the hydrogen atoms, or to the combined total of the other halogen atoms and hydrogen atoms, is at least 1:1.

The A moiety of the $R_{hal}$ radical of Formula I is preferably perfluorinated. The preferred carbon content of the alkyl or perfluoroalkyl groups which may be contained in the A moiety is from 1–6 carbon atoms.

Specific examples of preferred embodiments of the

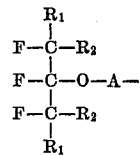

moiety of the radical of Formula I when $m$ and $n$ are both 0 include the following:

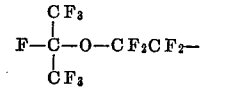

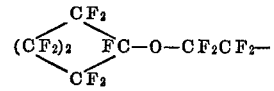

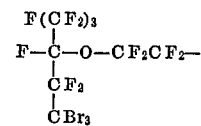

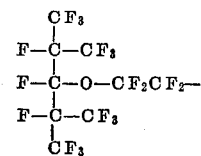

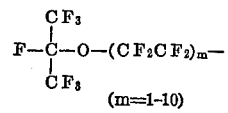
(m=1-10)

When in above Formula I the sum of $m$ and $n$ is at least 1, specific examples of the preferred embodiments of the

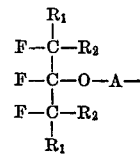

moiety of the radical of Formula I in addition to those listed above include the following:

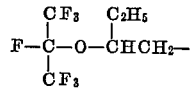

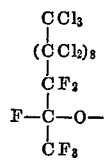

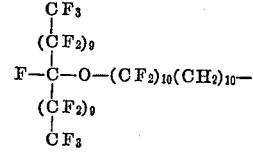

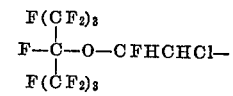

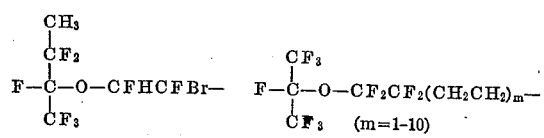
(m=1-10)

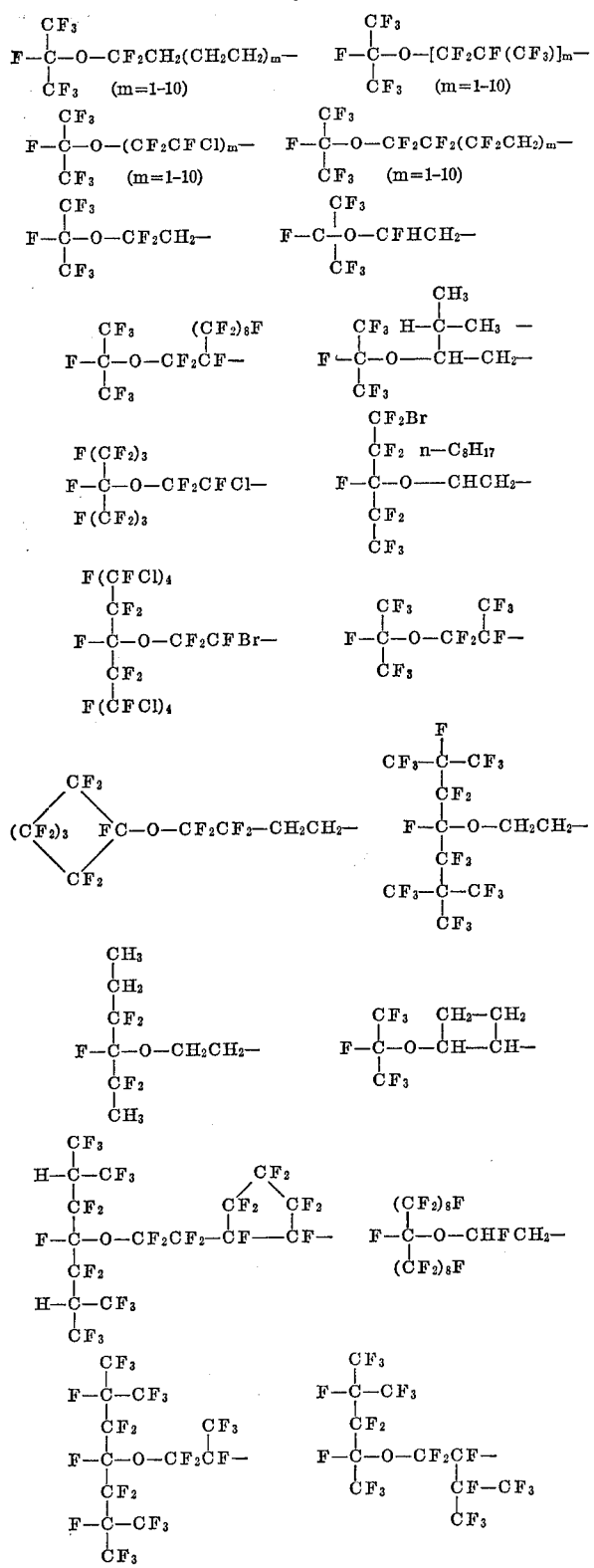

Preferred specific $R_{hal}$ radicals corresponding to the general Formula I above, have the formula (III) 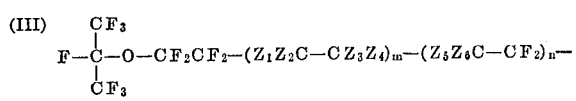

wherein $-(Z_1Z_2C-CZ_3Z_4)-$ is derived from an ethylenically unsaturated compound selected from the group consisting of tetrafluoroethylene, ethylene, vinylidene fluoride, chlorotrifluoroethylene and perfluoropropylene, wherein $-(Z_5Z_6C-CF_2)-$ is derived from an ethylenically unsaturated compound selected from the group consisting of tetrafluoroethylene, vinylidene fluoride, chlorotrifluoroethylene, and perfluoropropylene, and wherein both $m$ and $n$ are integers of from 0 to 75. More preferably, $m$ and $n$ are both integers of from 0 to 40. Still more preferably both $m$ and $n$ are integers of from 0 to 7.

More specific preferred embodiments are those in which in above Formula III $-(Z_1Z_2C-CZ_3Z_4)-$ and $-(Z_5Z_6C-CF_2)-$ are both $-(CF_2CF_2)-$, and specifically those wherein $m$ is 0.

Unsaturated compounds suitable for reaction with the polyhaloisoalkoxyalkyl halide telogen of Formula II above, include the following: $CF_2=CF_2$, $CF_2=CH_2$, $CCL_2=CH_2$, $CFH=CH_2$, $CClH=CH_2$, $CH_2=CH_2$, $CFH=CF_2$, $CFH=CFH$, $CClH=CClH$, $CF_2=CFCl$, $CF_2=CFBr$, $CF_3CF=CF_2$, $CF_2ClCF=CF_2$, $CF_3CH=CF_2$, $CF_3CCl=CF_2$, $(CF_3)_2C=CF_2$, $CF_3CF=CFCl$, $CF_3CH=CFCl$, $CFCl=CFCl$, $CF_3CF=CH_2$, $CF_2ClCF=CF_2$, $CF_2BrCF=CF_2$, $CF_3CF=CFCF_3$, $CF_2=CFCF_2CF_3$, $CHF=CFCFCl_2$, $CHF=CFCF_3$, $CF_2=CF(CH_2)_6CH_3$, $CF_2=CFCHClCH_3$, $CF_2=CF(C_6H_4Cl)$, $CF_2=CF(C_6H_4(C_6H_4(CH_3)))$, $CF_2=CF(C_6H_4(CH_2Cl))$, $CF_2=CHCF_2CH_3$, $CF_2=CHCF_2CH_2Cl$, $CF_2=CHCF_2(C_6H_5)$, $CF_2=CHCF_2(C_6H_4Cl)$, $CF_2=CHCF_2(C_6H_4(CH_3))$, $CF_2=CHCF_2(C_6H_4(CH_2Cl))$, $CH_2=CCF_3CF_2Br$, $CF_2=C(CF_3)CF_2(C_3H_7)$, $CHCl=CFCF_3$, $CH_2=CClCF_2CH_3$,

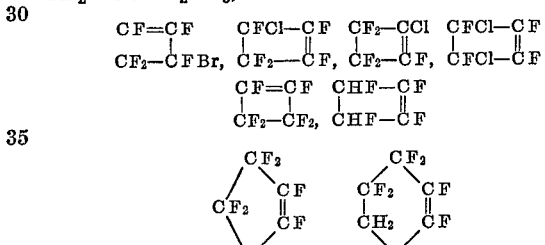

$CH_2=C(C_2H_5)_2$, $CH_2=CH-C_6H_5$, and $CH_2=CHCH_2CH(OC_2H_5)_2$

All of the above-listed unsaturated compounds are suitable to furnish the bifunctional group $$-(Z_1Z_2C-CZ_3Z_4)-$$

in Formula I, those having a terminal $=CF_2$ group being suitable to furnish the bifunctional group $$-(Z_5Z_6C-CF_2)-$$

in Formula I. A portion of this listing has been taken from the exemplary telomerizable unsaturated compounds listed in U.S. Pat. 3,145,222. Many more suitable telomerizable unsaturated compounds will readily occur to one of ordinary skill in the art. The moieties in the telomer iodide denoted by the telomerizable unsaturated compounds are not critical portions of the molecule.

With respect to the perfluoroalkyl iodides suitable for use in the process of the present invention wherein $R_{hal}$ is perfluoroalkyl, linear or branched chain, having from 1 to 20 carbons, those having from 3 to 10 carbons, those having a terminal perfluoroisopropyl group, and those having from 4 to 10 carbons and having a terminal perfluoroisopropyl group are preferred.

With respect to the 1-hydroxy-2-alkenes suitable for use in the process of, and for the preparation of the novel terminally unsaturated polyfluoro-olefins in accordance with the present invention having the general formula $$\begin{array}{c} R \\ | \\ C=CH-CH_2OH \\ | \\ R' \end{array}$$

wherein R and R' are independently selected from the group consisting of hydrogen and alkyl radicals, linear or branched chain, having from 1 to 10 carbons, those wherein at least one of R and R' is hydrogen are preferred. Specific examples of preferred embodiments include allyl alcohol and crotyl alcohol.

A preferred embodiment within the scope of the invention are compounds of the formula

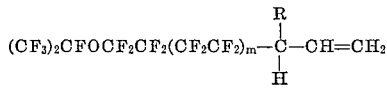

wherein $m$ is an integer 0 to 5 and R is selected from the group consisting of hydrogen and methyl.

The process of the present invention is carried out by heating a mixture of a polyhalofluoroalkyl iodide, as hereinabove defined, with a 1-hydroxy-2-alkene in a closed vessel that is, under autogenous pressure, until the reaction is completed. For example, the reaction of crotyl alcohol with 1-iodo-2-heptafluoroisopropyl tetrafluoroethyl ether would produce the compound of the formula

Upon completion of the reaction the desired product may be separated from unreacted starting materials and from by-products, if present, by conventional methods, such as fractional distillation, crystallization, and others.

The molar ratio in which the reactants may be employed is not critical. The reactants may be charged in stoichiometric amounts, or an excess of either reactant may be employed. Since the polyhalofluoroalkyl iodides generally are more expensive than the 1-hydroxy-2-alkenes, it is preferred, for the sake of economy, to either employ equimolar amounts or an excess of the 1-hydroxy-2-alkenes. The reactants may be suitably charged in a molar ratio of 1 mol of polyhalofluoroalkyl iodide to about 0.5 to about 10, preferably about 1 to about 4 mols, of 1-hydroxy-2-alkene reactant.

The reaction temperature and reaction times are dependent upon the particular reactants involved, and upon the reaction conditions employed. Suitable reaction temperatures may range between about 100° C. and about 450° C. At temperatures below about 100° C. the reaction tends to be too slow for practical operation, and at temperatures above about 450° C. there is danger of product decomposition. Preferred reaction temperatures range between about 150° C. and about 300° C. Most preferred are temperatures between about 175° C. and about 250° C.

The required reaction times may vary between about 10 minutes and about 100 hours, under preferred reaction conditions between about 10 to about 25 hours.

While the reaction may optionally be conducted in the presence of an inert organic solvent, the presence of a solvent is not required, and in the preferred embodiment of this invention an inert organic solvent is not employed.

The reaction may be carried out at atmospheric pressure, preferably at the reflux temperature of the reaction mixture. Since the speed of the reaction increases with the reaction temperature, it is preferred, for the sake of shorter reaction times, to conduct the reaction at superatmospheric pressures in closed vessels at temperatures above the reflux temperature of the reaction mixture at atmospheric pressure. Reaction pressures are a function of the reaction temperature, and depend upon the particular reagents employed, and upon such other factors as for example reactant molar ratios and the volume of the reagents in relation to the total volume of the reactor. Reaction pressures, if superatmospheric pressures are employed, are not critical, and may vary between about 1 p.s.i.g. and about 1000 p.s.i.g.

The reaction may be carried out batchwise or on a continuous basis.

Upon completion of the reaction the desired product may be recovered from the reaction mixture by conventional means, as for example by fractional distillation, crystallization, and others. Preferably the reaction mixture is taken up in a suitable solvent, such as, for example, methylene chloride, ether, acetonitrile, carbon tetrachloride, and the like, the solution is filtered to remove insoluble carbonaceous contaminants, and the desired product is recovered from the solution by removal of the solvent as for example by distillation. The product may be purified by conventional means, as e.g. fractional distillation.

The following examples are given to illustrate the process of the present invention and to show the preparation of representative compounds of the present invention, but are not intended to be limiting on the scope thereof. In these examples the yield is defined as the percentage of desired product actually obtained of the amount theoretically possible, based on the amount of polyfluoroalkyl iodide charged to the reaction.

Example 1

This example illustrates the preparation of 3-(n-perfluoroheptyl)propylene-1.

A stainless steel autoclave of 300 milliliter capacity was charged with 133 g. (0.27 mol) of perfluoroheptyl iodide and 31 g. (0.54 mol) of allyl alcohol. The autoclave was evacuated, sealed to the atmosphere, placed in a mechanical shaker, and its contents, under constant shaking, were heated to 200° C. by means of external electrical heaters, and were maintained under these conditions for a period of 18 hours, after which time the autoclave and contents were allowed to cool to room temperature. The autoclave was then vented to the atmosphere and the liquid reaction product was taken up with 150 milliliters of methylene chloride. There was obtained a dark, turbid solution, which was filtered to remove insoluble carbonaceous contaminants. The clear filtrate was placed in the pot of a distillation apparatus equipped with a reflux condenser, suitable for distillation under reduced pressure, and the methylene chloride was distilled off at atmospheric pressure. After the methylene chloride was substantially distilled off, the still was evacuated to about 100 mm Hg. There was recovered as distillate a main fraction of 67 g. (0.16 mol) of the liquid product 3 - (perfluoroheptyl)propylene-1 in 61 percent yield, boiling at 86–87° C. at 100 mm. Hg. Elemental analysis of this product compared with the calculated composition of $n$—$C_7F_{15}$—$CH_2$—$CH$=$CH_2$ as follows:

Theory for $C_{10}F_{15}H_5$ (percent): C, 29.26; F, 69.51; H, 1.22; I, none. Found (percent): C, 29.2; F, 69.7; H, 1.31; I, none.

The assigned structure was confirmed by infrared analysis which showed a hydrogen absorption band at 3.35$\mu$ and a C=C absorption band at 6.08$\mu$.

The presence of a double bond was confirmed by bromine addition. A 50 ml. flask was charged with 10 g. (0.024 mol) of 3-(perfluoroheptyl)-propylene-1, the product of Example I. Four g. (0.25 mole) of elemental bromine were slowly added with constant swirling of the flask while the contents thereof were irradiated with a 150 watt spotlight. The temperature of the contents of the flask rose to about 50° C. After all the bromine had been added a flow of nitrogen gas was passed over the liquid in the flask to remove excess bromine. The expected dibromide, 1,2 - dibromo - 1,1,2,3,3 - pentahydroperfluorodecane was obtained in quantitative yield. It had a melting point of 33–35° C. Elemental analysis of the product compared with theoretical values as follows:

Theory for $C_{10}F_{15}H_5Br_2$ (percent): C, 21.05; F, 50.00; H, 0.88; Br, 28.09.

Found (percent): C, 21.3; F, 50.5; H, 0.86; Br, 27.9.

Example II

This example shows the preparation of 3-(perfluoroheptyl)-3-methyl-propylene-1.

The stainless steel autoclave used in Example I was charged with 150 g. (0.38 mol) of perfluoroheptyl iodide and 55 g. (0.76 mol) of crotyl alcohol. The reaction was carried out in the manner of and under the reaction conditions described in Example I. The liquid reaction product was taken up with 150 ml. of methylene chloride. The solution was filtered to remove insoluble carbonaceous contaminants, and the filtrate was subjected to fractional distillation in the equipment described in Example I. After the more volatile methylene chloride was substantially distilled over at atmospheric pressure, the still was evacuated to about 90 mm. Hg. There was recovered as distillate a main fraction of 57 g. (0.13 mol) of 3-(perfluoroheptyl)-3-methylpropylene-1, boiling at 102° C.–105° C. at 90 mm. Hg in 34 percent yield. Elemental analysis of the product so obtained compared with the calculated composition of $C_7F_{15}C(CH_3)H$—$CH=CH_2$ as follows:

Theory for $C_{11}F_{15}H_7$ (percent): C, 31.11; F, 67.22; H, 1.65.

Found (percent): C, 31.1; F, 66.8; H, 1.87.

The assigned structure was confirmed by infrared analysis showing the presence of a hydrogen absorption band at 3.4μ and a C=C absorption band at 6.08μ.

Example III

This example illustrates the preparation of 3-(tetrafluoro-2-heptafluoroisopropoxyethyl)-propylene-1.

The stainless steel autoclave used in Example I was charged with 125 g. (0.3 mol) of 1-iodo-2-heptafluoroisopropyl tetrafluoroethyl ether having a boiling point of 86° C.–87° C., and 35 g. (0.6 mol) of allyl alcohol. The reaction was carried out in the manner of and under the reaction conditions employed in Example I, and the product was recovered in the manner described in Example I, except that the distillation was conducted at atmospheric pressure throughout. There was recovered as distillate a main fraction of 32.5 g. (0.1 mol) of the liquid product 3-(tetrafluoro-2-heptafluoroisopropoxyethyl) - propylene-1 in 41 percent yield, boiling at 95–96° C. at atmospheric pressure. Elemental analysis of the product so obtained compared with the calculated composition of $(CF_3)_2CFO$—$CF_2CF_2CH_2CH=CH_2$ as follows:

Theory for $C_8F_{11}H_5O$ (percent): C, 29.44; F, 64.11; H, 1.53.

Found (percent): C, 30.45; F, 63.92; H, 1.64.

The assigned structure was verified by infrared analysis which showed a hydrogen absorption band at 3.3μ, and a C=C absorption band at 6.1μ.

Example IV

This example illustrates the preparation of 3-(tetracosafluoro-12-heptafluoroisopropoxylauryl) - propylene-1.

In the manner of and in the equipment employed in Example I there are reacted 60 g. (0.065 mol) of

$(CF_3)_2CFOCF_2CF_2$—$(CF_2CF_2)_5I$ and 11.6 g. (0.195 mol) of allyl alcohol at a temperature of 225° C. for a period of 18 hours. The product is taken up with 100 ml. of ether. The solution so obtained is filtered, and the clear filtrate is subjected to fractional distillation in the manner described in Example I. After the more volatile ether is substantially distilled off, there is recovered as a main fraction of 36 g. (0.43 mol) of 3-(tetracosafluoro-12-heptafluoroisopropoxylauryl) - propylene-1 in 66 percent yield.

Example V

This example illustrates the conversion of 3-(perfluoroheptyl)-propylene-1 to the corresponding 1,1,1,2,3,3-hexahydroperfluorodecanol-2.

A 100 ml. flask was charged with 20 g. (0.049 mol) of 3-(perfluoroheptyl)-propylene, the product of Example I, and 14 g. of 80 percent aqueous sulfuric acid. The mixture so obtained was heated to 100° C. for a period of two hours, was then cooled to room temperature, and 25 milliliters of water were added. The mixture so diluted was heated to 100° C. for a period of one hour, was then cooled to room temperature and was extracted with ether. The etheral extract was dried over sodium sulfate, and was subjected to fractional distillation. After the more volatile ether was substantially distilled off at atmospheric pressure the still was evacuated to about 13 mm. Hg, and there was recovered as distillate a main fraction of 5 g. (0.012 mol) of $C_7F_{15}CH_2CHOHCH_3$ boiling at 87–90° C. at 13 mm. Hg, in 24 percent yield.

Elemental analysis of this product compared with the theoretical composition thereof as follows:

Theory for $C_{10}F_{15}H_7O$ (percent): C, 28.04; F, 66.59; H, 1.64.

Found (percent): C, 29.2; F, 66.2; H, 1.45.

The assigned structure was confirmed by infrared analysis which showed the presence of a hydroxyl absorption band at 3.35μ.

While the polyfluoroalkyl iodides useful as starting material for the preparation of terminally unsaturated polyfluoroolefinic compounds in accordance with the present invention may be prepared as discrete compounds, they are generally obtained as mixtures of compounds of varying chain length and corresponding varying molecular weights. It is to be understood that both the individual discrete polyfluoroalkyl iodides, as well as their mixtures of compounds of varying chain length, are suitable for use in the process of the present invention and for the preparation of the novel compounds of this invention. When employing as starting material mixtures of polyfluoroalkyl iodides of varying chain length, there will, of course, be obtained terminally unsaturated polyfluoroolefinic compounds of varying chain length. If desired, individual products can be separated from such product mixtures by conventional separation techniques, as for example by fractional distillation, or by fractional crystallization using an inert solvent such as methylene chloride, ether, acetonitrile, carbon tetrachloride, and the like, or the product mixture may be separated into fractions of narrow ranges of molecular weights having desired properties. It is intended that the appended claims cover the individual compounds as well as mixtures thereof having varying chain length.

Since various changes and modifications may be made in the invention without departing from the spirit and essential characteristics thereof, it is intended that all matter contained in the above description shall be interpreted as illustrative only, the invention being limited only by the scope of the appended claims.

We claim:
1. Compounds having the structural formula:

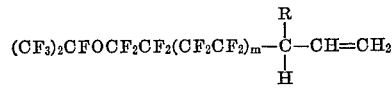

wherein $m$ is an integer 0 to 5 and R is selected from the group consisting of hydrogen and methyl radicals.

2. Compounds as defined in claim 1 wherein R is hydrogen.

3. A compound as defined in claim 2 which is

$(CF_3)_2CFOCF_2CF_2CH_2CH=CH_2$

4. A compound as defined in claim 2 which is

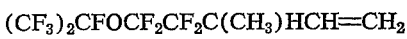
$(CF_3)_2CFOCF_2CF_2C(CH_3)HCH=CH_2$

5. A compound as defined in claim 2 which is

$(CF_3)_2CFOCF_2CF_2(CF_2CF_2)_5CH_2CH=CH_2$

6. A process for making compounds having the formula

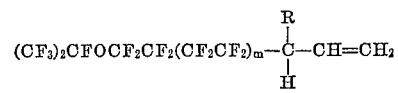

wherein $m$ is an integer 0 to 5 and R is selected from the group consisting of hydrogen and methyl radicals, which comprises reacting a compound having the formula:

$(CF_3)_2CFOCF_2CF_2)CF_2CF_2)_m$—I wherein *m* has the aforementioned meaning, with an alcohol having the formula:

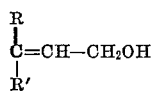

wherein R and R' have the aforementioned meanings, at temperatures between about 175° C.–450° C. and under autogenous pressure.

7. The process described in claim 6 wherein the reaction temperatures are maintained between about 175° C.–300° C.

8. The process defined in claim 6 wherein the reaction temperatures are maintained between about 175° C.–250° C.

9. The process defined in claim 6 wherein R is hydrogen.

References Cited
UNITED STATES PATENTS 3,382,222   5/1968   Pittman et al. _____ 260—614F
3,388,078   6/1968   Evans et al. _____ 260—614FUX HOWARD T. MARS, Primary Examiner U.S. Cl. X.R.

117—139.5, 161; 260—89.5, 611, 633, 653.1, 653.3